(12) United States Patent
Arai et al.

(10) Patent No.: US 8,308,292 B2
(45) Date of Patent: Nov. 13, 2012

(54) SOFT CONTACT LENS

(75) Inventors: Hiroyuki Arai, Kanagawa (JP); Sunao Mikawa, Tokyo (JP)

(73) Assignee: Universal View Co., Ltd., Tokyo (JP)

( * ) Notice: Subject to any disclaimer, the term of this patent is extended or adjusted under 35 U.S.C. 154(b) by 0 days.

(21) Appl. No.: 13/501,745

(22) PCT Filed: Oct. 6, 2010

(86) PCT No.: PCT/JP2010/067592
§ 371 (c)(1),
(2), (4) Date: Apr. 12, 2012

(87) PCT Pub. No.: WO2011/048953
PCT Pub. Date: Apr. 28, 2011

(65) Prior Publication Data
US 2012/0200821 A1    Aug. 9, 2012

(30) Foreign Application Priority Data
Oct. 20, 2009  (JP) .................................. 2009-241769

(51) Int. Cl.
*G02C 7/04* (2006.01)
(52) U.S. Cl. .......... 351/159.24; 351/159.31; 351/159.33
(58) Field of Classification Search ............. 351/159.07, 351/159.09, 159.22, 159.24, 159.29, 159.31, 351/159.33
See application file for complete search history.

(56) References Cited

U.S. PATENT DOCUMENTS

| | | | |
|---|---|---|---|
| 5,245,367 A | 9/1993 | Miller | |
| 5,260,727 A * | 11/1993 | Oksman et al. | 351/159.03 |
| 5,719,656 A * | 2/1998 | Bowling | 351/159.02 |
| 5,757,458 A | 5/1998 | Miller | |
| 5,786,883 A | 7/1998 | Miller | |
| 5,905,561 A * | 5/1999 | Lee et al. | 623/6.31 |
| 6,585,377 B2 * | 7/2003 | Ortega et al. | 351/243 |
| 7,491,350 B2 * | 2/2009 | Silvestrini | 264/1.1 |
| 2002/0075447 A1 | 6/2002 | Andino | |

FOREIGN PATENT DOCUMENTS

| | | |
|---|---|---|
| AU | 694743B2 B2 | 7/1998 |
| CA | 2169857 A1 | 3/1995 |
| EP | 0724745 A1 | 8/1996 |

(Continued)

OTHER PUBLICATIONS

International Search Report for PCT/JP2010/067592, Nov. 9, 2010.

*Primary Examiner* — Scott J Sugarman
(74) *Attorney, Agent, or Firm* — Chernoff, Vilhauer, McClung & Stenzel LLP

(57) ABSTRACT

A soft contact lens for fitting to a cornea includes a lens main body made of a light permeable member. The lens main body has a diameter larger than that of a light-shielding portion which shields incident light incident to the cornea. The light-shielding portion includes a main body constituting a light-shielding member, an aperture that allows incident light to be transmitted, the aperture being positioned on a position of the main body of the light-shielding portion, and multiple holes that maintain a scotopic vision and a night vision, the holes being provided around the aperture in the main body of the light-shielding portion and each of the holes having a diameter smaller than that of the aperture.

36 Claims, 5 Drawing Sheets

FOREIGN PATENT DOCUMENTS

| | | |
|---|---|---|
| EP | 1337890 A1 | 8/2003 |
| JP | H08-29740 A | 2/1996 |
| JP | H09-502542 A | 3/1997 |
| JP | H11-242191 A | 9/1999 |
| JP | 2004-510199 A | 4/2004 |
| JP | 2007-516019 A | 6/2007 |
| WO | 9508135 A1 | 3/1995 |
| WO | 0227388 A1 | 4/2002 |
| WO | 2004105588 A2 | 12/2004 |

* cited by examiner

SOFT CONTACT LENS

This is a national stage application filed under 35 USC 371 based on International Application No. PCT/JP2010/067592 filed Oct. 6, 2010, and claims priority under 35 USC 119 of Japanese Patent Application No. 2009-241769 filed Oct. 20, 2009.

TECHNICAL ART

This invention relates to a soft contact lens which is used with it being fitted to a cornea. Particularly, it relates to one such that by making a pinhole in a center of a light-shielding portion that shields light, it is available for any correction of myopia, hyperopia, astigmatism and presbyopia utilizing a depth of focus by the pinhole and by piercing a plurality of fine holes around the pinhole, it is capable of maintaining a night vision in a periphery of an image.

TECHNICAL BACKGROUND

An image of a subject which a person sights is confirmed as a vision so that light of the subject to be incident to a cornea is refracted by the cornea and an eye lens to enter a vitreous body and it is focused on a retina which exists on a back surface side of the vitreous body, thereby sending the focused visual information to cerebrum via optic nerve. In this moment, when the light of the subject is focused on a position in front of or behind the retina, myopia or hyperopia occurs. Further, when the cornea or the eye lens is distorted, it is not focused on the retina, which causes the astigmatism.

As means for correcting such myopia, hyperopia, astigmatism and the like, a correction by a pair of glasses, a correction by a contact lens or the like has been widely performed. Further, for a correction of presbyopia, bifocal glasses (bifocal lens) or the like in which there are a portion for far viewing and a portion for close viewing in one lens have been utilized.

Additionally, as a technology for correcting the presbyopia securely, a mask configured to be implanted in a cornea of a patient has been proposed, which includes an anterior surface that resides adjacent a first corneal layer, a posterior surface that resides adjacent a second corneal layer, a plurality of holes extending at least partially between the anterior surface and the posterior surface, an aperture configured to transmit along an optic axis substantially all incident light and a substantially opaque portion surrounding at least a portion of the aperture (see a patent document 1 followed).

PRIOR ART

Patent Document

[Patent Document 1] Japanese Patent Translation Publication No. 2007-516019 (corresponding to WO2004/105588)

SUMMARY OF THE INVENTION

Problem to be Solved by the Invention

However, in the mask disclosed in the patent document 1, it has a problem such that since the mask is configured to be implanted in a cornea of a patient, any surgical operation is required, which make it difficult that a user can use the mask easily and safely like a generally used contact lens that is fitted to a cornea. Further, it has a problem such that since the plurality of holes in the mask is provided for preventing a substantial nutrient depletion in the corneal layer, the mask configured by an opaque member without the aperture cannot maintain a sufficient amount of light (up to a night vision) in a periphery of an image even if a small amount of light is incident via the holes for transporting the nutrient.

Thus, this invention, to solve the above-mentioned problems, has an object to provide a soft contact lens which maintains a sufficient amount of light in a periphery of an image and is able to be available for a correction of myopia, hyperopia, astigmatism, presbyopia and the like.

Means for Solving the Problems

In order to solve the above-mentioned problems, a contact lens according to this invention is a soft contact lens which is fitted to a cornea, the soft contact lens comprising a light-shielding portion which shields incident light that is incident to the cornea, and a lens main body made of a light permeable member that allows incident light to be transmitted, the lens main body having a diameter larger than that of the light-shielding portion and covering a front surface of the light-shielding portion and a back surface thereof, wherein the light-shielding portion contains a main body of the light-shielding portion which is made of a light-shielding member, an aperture that allows the incident light to be transmitted, the aperture being positioned on a position of the main body of the light-shielding portion, the position including an optical axis extending to a center of the cornea and a center of a retina, and a plurality of holes that maintains a scotopic vision and a night vision, the holes being provided around the aperture in the main body of the light-shielding portion and each of the holes having a diameter smaller than that of the aperture.

When the soft contact lens according to this invention is fitted to the cornea, an image (light) is passed through a front surface of the lens, a pinhole and a back surface of the lens to be incident to the cornea. The image that is incident to the cornea enters an eye lens and a vitreous body inside an eye ball through the cornea and a pupil of the eye and is focused on the retina at a back side of the vitreous body. In this moment, as a beam is limited to a constant amount by a pinhole formed in the light-shielding portion, the image is always focused on the retina even when seeing a distant place or seeing a close place.

Light surrounding the pinhole is incident via a plurality of fine holes pierced around the pinhole and is focused on the retina through the cornea, the vitreous body and the like. This enables brightness surrounding the image to be kept. Further, the images of the pinhole and in a periphery of the light-shielding portion are transmitted to a light transmission portion (a lens main body) provided around the light-shielding portion, are incident to the cornea, enter the vitreous body inside the eye ball through the pupil of the eye and are focused on the retina at a back surface side of the vitreous body. This enables a peripheral vision in a periphery of the image to be kept, thereby allowing a vision which is similar to that of the naked eye to be obtained.

Effect of the Invention

According to the invention, it is possible to provide a soft contact lens which, by making a pinhole in a center of a light-shielding portion that shields incident light, is available for any correction of myopia, hyperopia, astigmatism and presbyopia utilizing a depth of focus by the pinhole. Further, according to the invention, by piercing a plurality of fine holes around the pinhole, it is capable of maintaining a sufficient night vision (brightness) in a periphery of the image with maintaining any light-shielding mechanism.

EMBODIMENTS FOR CARRYING OUT THE INVENTION

Figure 1:
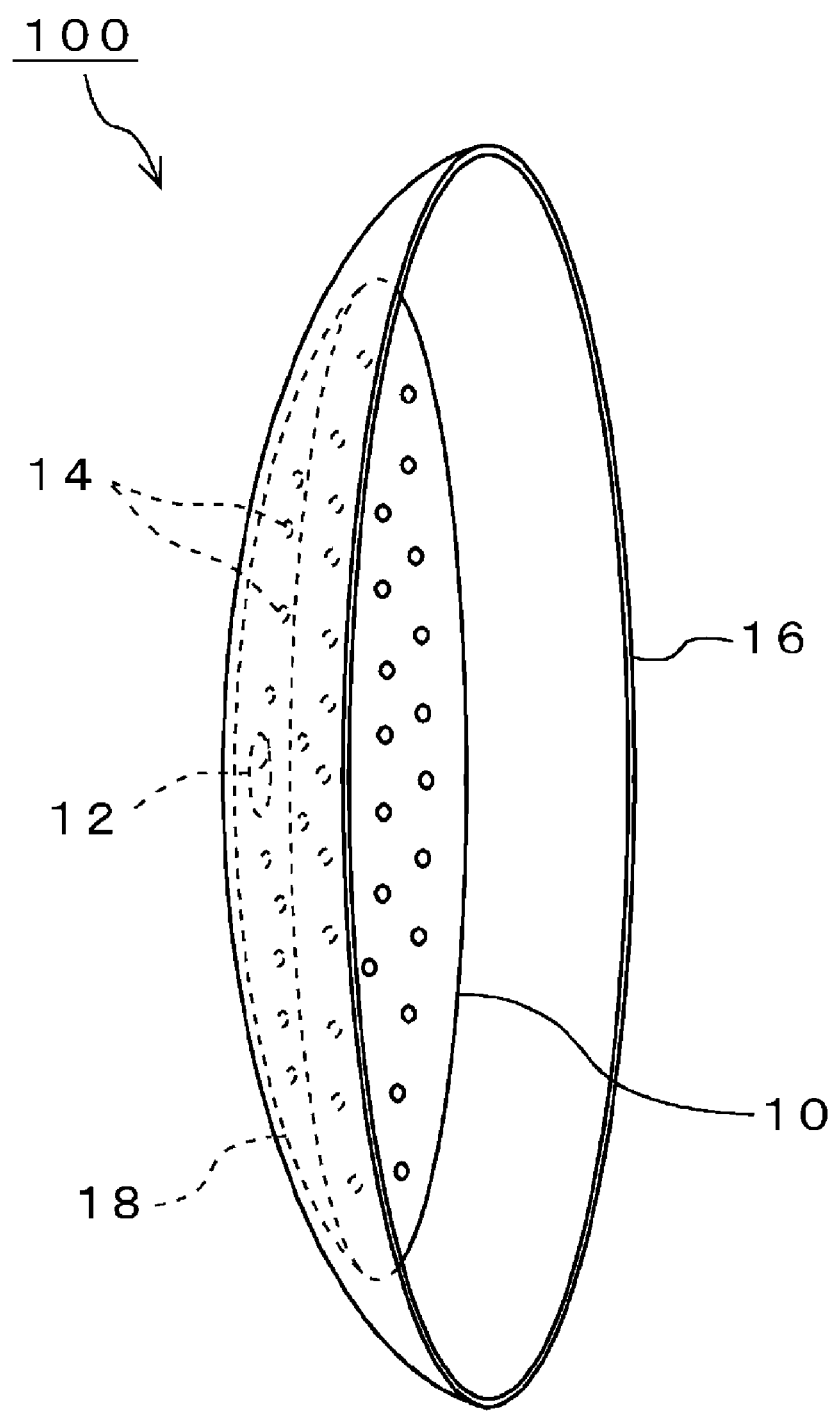
FIG. 1 is a perspective view of a soft contact lens according to one embodiment of this invention showing a configuration example thereof.

The following will describe a best mode for carrying out the invention (hereinafter, referred to as "embodiment").

Configuration Example of Soft Contact Lens

A soft contact lens 100 according to the invention is available for any correction of low-level myopia, hyperopia, astigmatism and presbyopia utilizing a depth of focus by the pinhole 12 made in a center of a light-shielding portion 10 and maintains a night vision (brightness) in a periphery of an image by piercing a plurality of fine holes 14 around the pinhole 12. This soft contact lens 100 is provided with the light-shielding portion 10 which shields light that is incident to the cornea 20 and a lens main body 16 supporting the light-shielding portion 10, as shown in FIGS. 1 through 4A.

The light-shielding portion 10 contains a main body 18 of the light-shielding portion, the pinhole 12 and a plurality of holes 14. The main body 18 of the light-shielding portion is a member having a shape having a curved surface so that it is parallel to a shape of a surface of the cornea 20 and showing a circle seen from a plane (see FIG. 6) and is made of a light-shielding member which shields light that is incident to the cornea 20. As material for the main body 18 of the light-shielding portion, any material which has been used in a soft contact lens with an iris and has already ensured safety is preferably used. For example, an azo coloring agent (red) or a phthalocyanine coloring agent (blue) can be used. A thickness of the main body 18 of the light-shielding portion is preferably set as thin as possible to prevent a light beam to a periphery of the lens (a light-transmitting portion 16C which will be described) from being shielded.

A diameter D1 of the main body 18 of the light-shielding portion is set to be, for example, within a range of 4.0 mm through 9.0 mm, taking into consideration a diameter of a pupil of the eye when the pupil of the eye is dilated (a dimension of the pupil of the eye in the darkness), which varies according to the aging. This is because if the diameter D1 of the main body 18 of the light-shielding portion is less than 4.0 mm, an area of the light-transmitting portion 16C (see FIG. 2), which will be described later, around the main body 18 of the light-shielding portion becomes larger so that a peripheral vision becomes wider but if a diameter of the pupil of the eye is larger than that of the light-shielding portion 10 during the night or the like, peripheral light without the light-shielding portion 10 enters a central part of the retina 26 so that a halo phenomenon or a glare occurs. This is also because if the diameter D1 of the main body 18 of the light-shielding portion exceeds 9.0 mm, an area of the light-transmitting portion 16C which transmits light that is incident to the lens main body 16 becomes smaller so that a peripheral vision cannot be maintained. In other words, this is because a vision (eyesight) that is similar to that of the naked eye cannot be maintained.

The pinhole 12 is an example of an aperture and made at a center position C of the main body 18 of the light-shielding portion, the position including an optical axis (eye axis) O extending to the cornea 20 and the retina 26. A hole shape of the pinhole 12 is preferably an accurate circle to prevent incident light from diffracting. Further, the pinhole 12 has a function to limiting flux of light that is incident to the cornea 20 to a constant amount thereof so that an image is focused on the retina 26 and takes effect corresponding to that by added dioptric power of multipoint lens based on a size of a diameter D2 of the pinhole 12.

As the diameter D2 of the pinhole 12, it is set to be within a range of, for example, 1.0 mm through 1.6 mm. It was understood that when altering the diameter D2 of the pinhole 12 within a range of 1.0 mm through 1.6 mm, a near vision was obtained corresponding to the added dioptric power of about 1.00 D through 3.00 D based on a variation in the size of the diameter thereof. Further, it was not capable of obtaining an optimal near vision when setting the diameter D2 of the pinhole 12 to be less than 1.0 mm or more than 1.6 mm. As the reason thereof, it is understood that as shown in the drawings, a depth of focus is deeper by changing the flux of light even in a non-dioptric lens.

Figure 2:
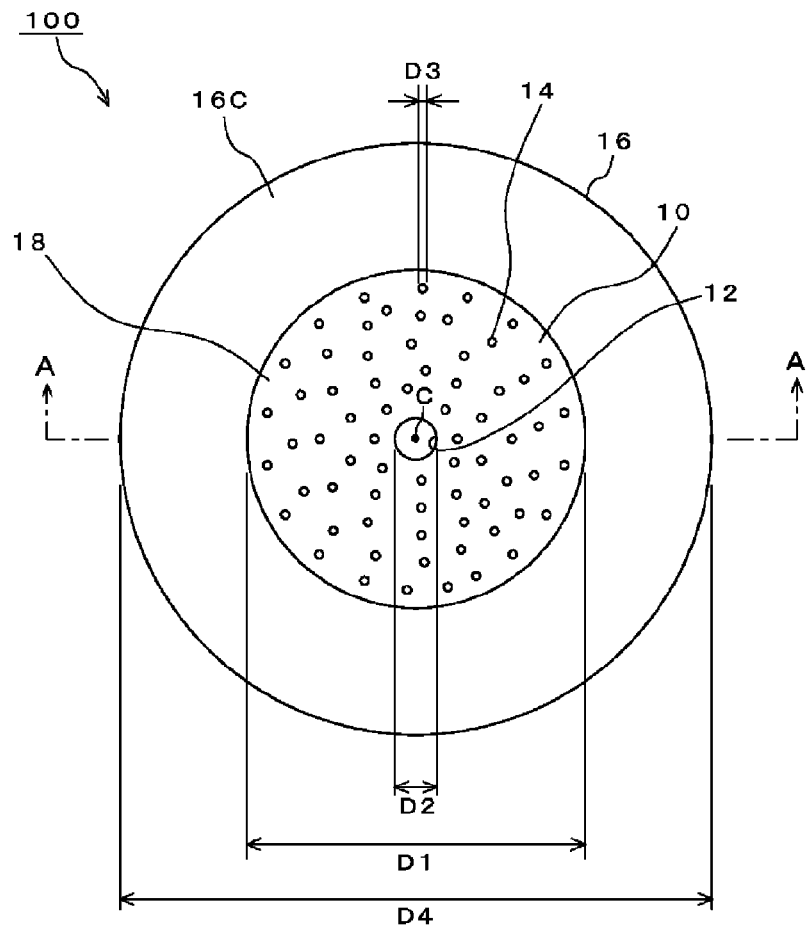
FIG. 2 is a plan view of the soft contact lens showing a configuration example thereof.
Figure 3:
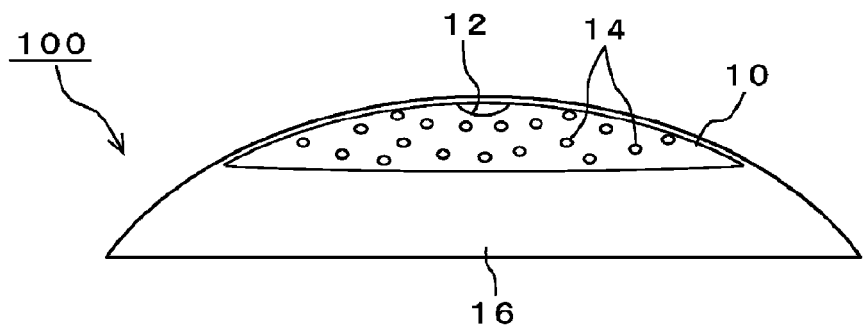
FIG. 3 is a side view of the soft contact lens showing a configuration example thereof.

The plurality of holes 14 is pierced in the main body 18 of the light-shielding portion between an outer periphery thereof and a rim of the pinhole 12 at random or regularly as shown in FIG. 2, and has a function to maintain brightness (night vision) by allowing light from outside to be incident to the cornea 20. Particularly, when using the soft contact lens 100 in the night or the darkness, they are effective for maintenance of an amount of light. The narrower the pitch between the holes 14 becomes, any sufficient brightness may be maintained. On the other hand, the broader the pitch between the holes 14 becomes, an improvement in a contrast of the image can be attempted.

Figure 4A:
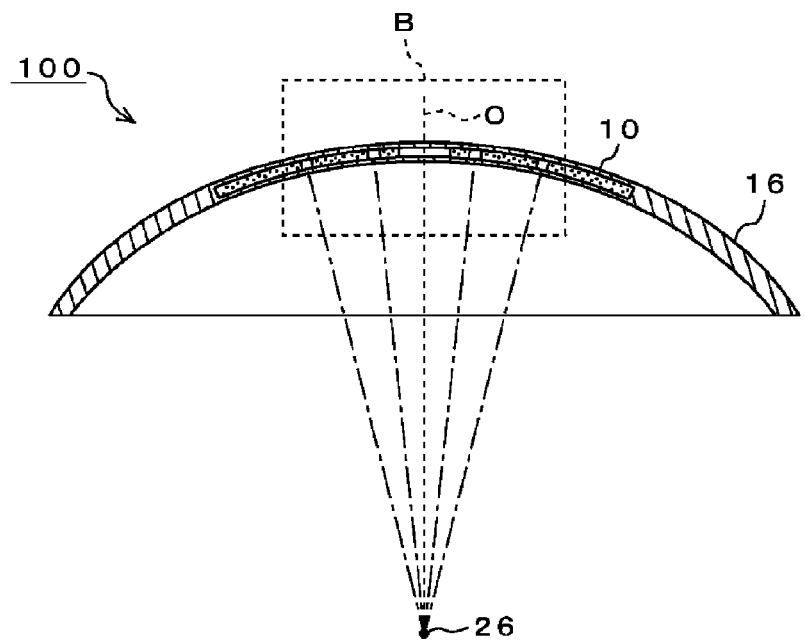
FIG. 4A is a cross sectional view of the soft contact lens, taking along the lines A-A shown in FIG. 2.

Further, a shape of each of the holes 14 is preferably an accurate circle to prevent incident light from diffracting. A depth direction (a passing-through direction) of each of the pinholes 14 is inclined toward the retina 26 (along an alternate long and short dash line) as shown in FIG. 4A so that it can focus incident light on the retina 26 effectively.

A diameter D3 of each of the holes 14 is set so as to be smaller the diameter of the pinhole 12 and is set so to be within a range of, for example, 0.17 mm through 0.18 mm. This is because when it is set to be less than 0.17 mm, the diameter of each of the holes 14 is too small to gather the incident light therein enough, which disables any night vision (brightness) to be maintained. This is also because when it is set to be more than 0.18 mm, the diameter of each of the holes 14 is too larger so that a halo or a glare phenomenon occurs by a diffraction of light.

Figure 6:
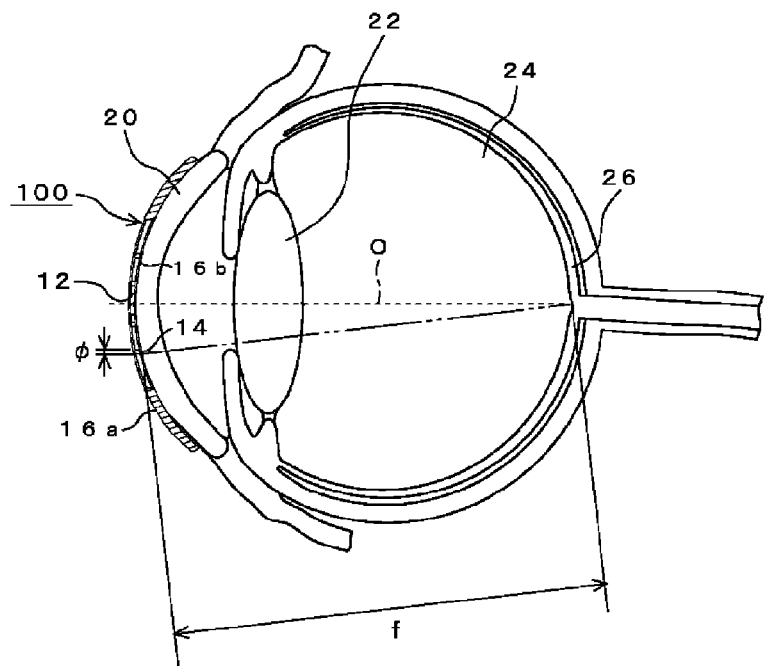
FIG. 6 is a diagram showing a state (No. 2) where the soft contact lens is fitted to the cornea.

Here, the optimal diameter D3 of each of the holes 14 may be get from a relationship between a focal distance from the cornea 20 to the retina 26 and a wavelength of light. As shown in FIG. 6, if a diameter of each of the holes 14 is Ø, a wavelength of light is λ, a distance from the cornea 20 to the retina 26 (a length of eye axis) is a focal distance f, the diameter Ø of each of the holes 14 is obtained by the following equation (1).

(Equation (1))

$$\phi = \sqrt{2\lambda f} \qquad (1)$$
$$= 0.03679\sqrt{f}$$

Here, the focal distance f is generally within a range of 23 mm through 24 mm so that when a numeral value of, for example, 23 mm is substituted for the equation (1), 0.176 mm is obtained as the optimal diameter Ø of each of the holes 14. Further, when a numeral value of 24 mm as the focal distance is substituted for the equation (1), 0.180 mm is obtained as the optimal diameter φ of each of the holes 14.

The lens main body 16 is a member having a shape having a curved surface (curvature) so that it is parallel to a shape of a surface of the cornea 20 and showing a circle seen from a plane and is made of a light-permeable member which can transmit incident light. As a material of the lens main body 16, hydroxy ethyl methacrylate (HEMA), N-vinylpyrrolidone (N-VP), dimethylacrylamide (DMAA), glycerol methacrylate (GMA), silicone hydrogel (SH) and the like, which are used as hydrous soft contact lens, are preferably used. Further, as a material of the lens main body 16, silicone rubber, butylacrylate and dimethylsiloxane lens, which are used as non-hydrous soft contact lens and hydrous soft contact lens, are preferably used. It is to be noted that any colored material such as red or blue one may be used when it can transmit the light even if not transparent.

The lens main body 16 is used as a replacement type soft contact lens or a disposable type soft contact lens. When a person has a slight extent of myopia, hyperopia or astigmatism, it is considered that a far vision or a near vision or both thereof can be obtained even if any dioptric power is not added. In the other case, a dioptric power of the lens may be added to the lens main body 16 on the basis of a condition of user's myopia or hyperopia. The lens main body 16 positioned around the main body 18 of the light-shielding portion functions as light-transmission portion 16C for maintaining a peripheral vision by gathering incident light into the cornea 20 as shown in FIG. 2.

Figure 5:
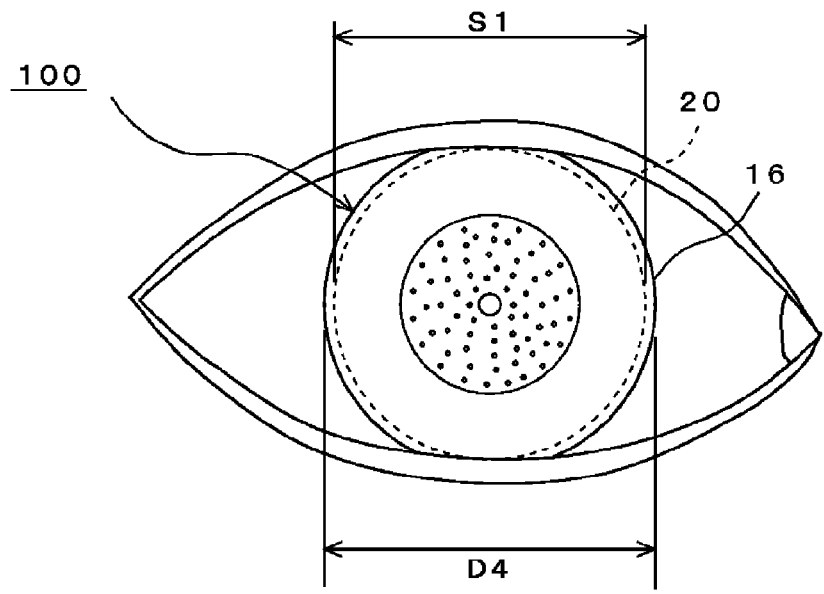
FIG. 5 is a diagram showing a state (No. 1) where the soft contact lens is fitted to a cornea.

A diameter D4 of the lens main body 16 is larger than the diameter D1 of the main body 18 of light-shielding portion and as shown in FIG. 5, is at least set so to be larger than a diameter S1 (for example, 12 mm) of the cornea 20, for example, about 14 mm. This is because if the diameter D4 of the lens main body 16 is smaller than the diameter of cornea, the lens extremely moves on the cornea 20 so that a center of the cornea 20 is excessively shifted to a center C of the main body 18 of light-shielding portion, which disables a stable vision to be maintained. Further, this is because if the diameter D4 of the lens main body 16 is set to be larger than 14 mm, it is difficult to fit the lens main body 16 on the cornea 20. The lens main body 16 having such a diameter is configured so as to be united to the main body 18 of light-shielding portion with it holding (covering) a front surface and a rear surface of the main body 18 of light-shielding portion by a front surface portion and a rear surface portion constituting the lens main body 16.

The following will describe a disposition or position of the light-shielding portion 10 constituting the soft contact lens 100 according to the invention with it being compared with the existing soft contact lens with the iris. First, the existing soft contact lens with the iris will be described. A colored portion (corresponding to the light-shielding portion 10 of this invention) of the existing soft contact lens with the iris may be disposed (colored) on a front surface or a rear surface of the lens so as to be exposed. However, if the colored portion is disposed on the front surface of the lens, roughness of a surface of the colored portion, which is made of a material that is different from that of the lens main body, contacts a palpebral conjunctiva (a rear side of an eyelid) so that a friction on the front surface of the lens becomes larger as compared with that of the rear surface of the lens. Accordingly, it has such a problem that in a moment of the blink of an eye, the lens main body extremely moves based on the friction of the palpebral conjunctiva and the colored portion and thus a center axis of the soft contact lens is excessively shifted from a center of the cornea (optical axis), which causes the soft contact lens to be used under unstable condition. On the contrary, if the colored portion is disposed on the rear surface of the lens, a friction on the rear surface of the lens becomes larger as compared with that of the front surface of the lens so that the colored portion of the lens main body is subject to becoming fixed to the cornea, which may cause any problems on a safety.

Figure 4B:
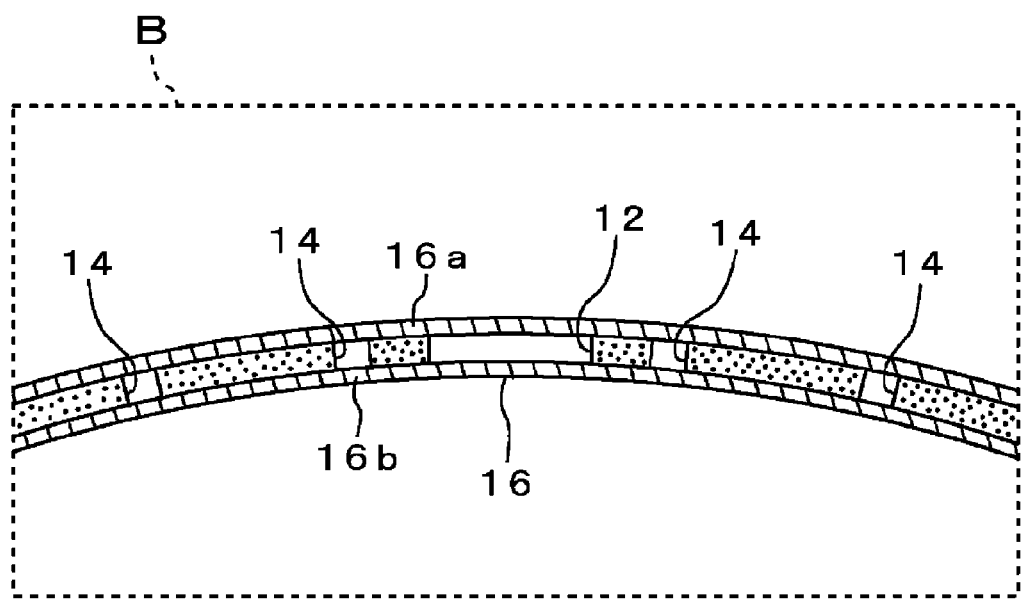
FIG. 4B is an enlarged view of an important portion B, which is enclosed by dotted line shown in FIG. 4A, in the soft contact lens.

Accordingly, in the soft contact lens 100 according to the invention, as shown in FIGS. 4A and 4B, the light-shielding portion 10 is held between the front surface and the rear surface of the lens main body 16 so that the light-shielding portion 10 is embedded in the lens main body 16. In other words, by positioning the light-shielding portion 10 at about a center of the lens main body 16 on its thickness direction, it is configured so that the light-shielding portion 10 is not exposed outward. This prevents extra friction from occurring at the front surface portion and the rear surface portion of the lens main body 16, which can avoid shifting the soft contact lens 100 from the optical axis to allow a stable vision to be maintained. Further, this prevents the lens main body 16 from being fixed to the cornea, which allows a safety to be maintained.

Functional Example of the Soft Contact Lens

Figure 7A:
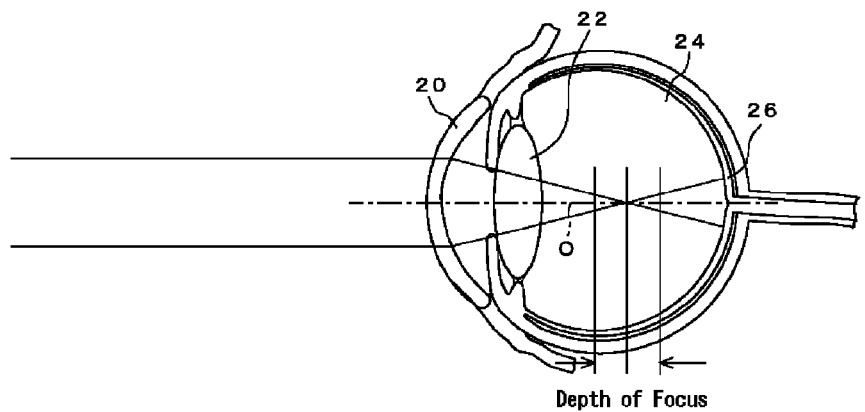
FIG. 7A is a diagram illustrating a depth of focus when seeing a distant place.
Figure 7B:
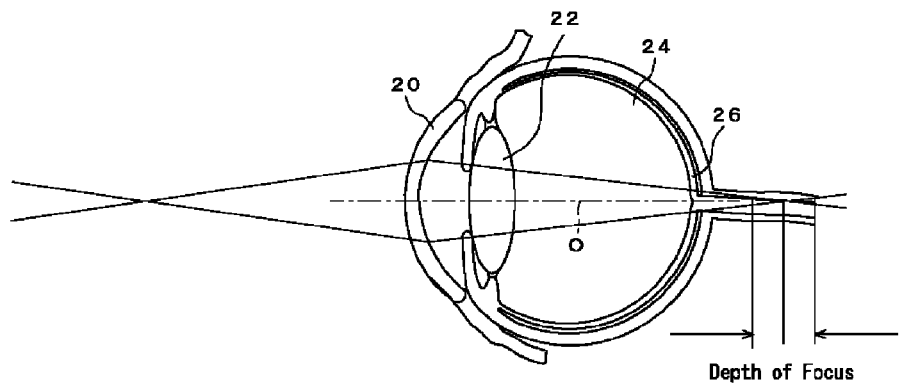
FIG. 7B is a diagram illustrating a depth of focus when seeing a close place.

The following will describe a functional example when fitting the soft contact lens 100 according to this embodiment to an eyeball. First, a general depth of focus in cases where a myope looks into the distance and a presbyope looks a near position will be described. As shown in FIG. 7A, when the myope looks into the distance, light that is incident to the eyeball is focused in front of the retina 26, not on a correct position of the retina 26. Further, since the depth of focus is also inadequate, it is in front of the retina 26. Further, as shown in FIG. 7B, when the presbyope looks a near position, the eye lens 22 loses elasticity and is stiff so that it is focused behind the retina 26, not on a correct position of the retina 26.

Figure 8:
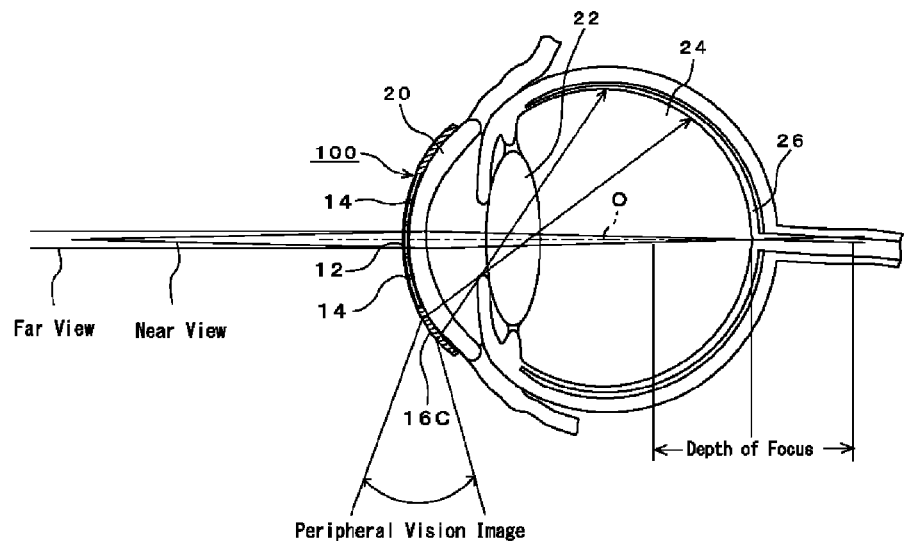
FIG. 8 is a diagram illustrating a depth of focus when seeing a distant place and seeing a close place.

On the other hand, when fitting the soft contact lens 100 according to this embodiment on the cornea 20, an image (light) is incident to the cornea 20 via a front surface portion 16a, the pinhole 12 and a rear surface portion 16b as shown in FIG. 8. The image that is incident to the cornea 20 enters a vitreous body 24 inside the eyeball through the cornea 29, the pupil of eye and the eye lens 22 and is focused on the retina 26 at the rear surface side of the vitreous body 24. In this moment, since an amount (rate) of the light that is incident into the eyeball through the pinhole 12 is not spread but limited to a constant amount thereof, an image is always focused on the same position of the retina 26 even when looking into the distance or looking a near position. Thus, since by using the soft contact lens 100, it is possible to meet a focal position on the retina 26 for any person with a mild myopia or hyperopia, astigmatism or presbyopia, it is available for any correction of the mild myopia or hyperopia, astigmatism or presbyopia.

Additionally, as shown in FIG. 8, light is also incident to a plurality of fine holes 14 pierced around the pinhole 12 and is focused on a position, which corresponds to a periphery of the image by the pinhole, of the retina 26 through the cornea 20, the eye lens 22, the vitreous body 24 and the like, thereby allowing a night vision (brightness) in the periphery of the image to be maintained. Further, a peripheral image by the pinhole 12 and the light-shielding portion 10 is penetrated into the light-transmitting portion 16C provided around the light-shielding portion 10, is incident to the cornea 20, enters the vitreous body 24 inside the eyeball through the pupil of the eye and is focused on the retina 26 at a rear surface side of the vitreous body 24. This enables a peripheral vision in a periphery of the image obtained by the pinhole 12 to be maintained, thereby allowing a field of vision that is similar to that of the naked eye to be obtained.

As described above, according to this embodiment, since the soft contact lens 100 utilizes a depth of focus by the pinhole 12, it is possible to look a near point by a minimum required control power of the eye lens 22. Further, when any dioptric power for myopia is not added to the lens main body 16, a burden is reduced even when working at the near point is performed. Further, in addition to the near point, this is effective to a hyperopia to which the control power of the eye lens 22 is required.

Further, according to the embodiment, since by adapting the pinhole 12, only the very narrow region of the cornea 20 is used as a vision, the soft contact lens 100 can be used even in a case of corneal astigmatism and corneal irregular astigmatism so that it is possible to apply the embodiment effectively to the astigmatism. It is also possible to obtain an effect that is equal to an added dioptric power for presbyopia by setting the diameter D2 of the pinhole 12 so as to be within a range of 1.0 mm through 1.6 mm and is possible to obtain a near vision corresponding to an added dioptric power for a multifocal lens.

Additionally, according to the soft contact lens 100 of this embodiment, it is possible to add dioptric power for myopia or hyperopia to the lens main body 16 when necessary and it is possible to add no dioptric power to the lens main body 16. If no dioptric power is added to the lens main body 16, an epoch-making soft contact lens 100 which can realizes a near vision without victimizing a far vision like bifocal lens may be provided.

According to this embodiment, by piercing a plurality of fine holes 14 around the pinhole 12, it is also possible to maintain a light-shielding function (a contrast for the image) and maintain the night vision (brightness) in a periphery of the image. Since the periphery of the light-shielding portion 10 is composed of the light-transmission portion 16C from which light is transmitted, it is also possible to maintain a peripheral vision that is similar to that of the naked eye.

Further, according to the soft contact lens 100 of this embodiment, it is possible to correct the presbyopia or the like by fitting the soft contact lens to the cornea 20 like a general contact lens. This enables the presbyopia or the like to be corrected more easily and in safety because it is not required to implant the soft contact lens in the cornea like the mask disclosed in the patent document 1.

It is to be noted that the subject matter contained in this invention is not limited to the above-mentioned embodiment; any variations of the above-mentioned embodiments, to which various kinds of alternations are added, are also contained without deviating from a spirit or concept of this invention. For example, although in the above-mentioned embodiments, shapes of the pinhole 12 and each of the holes 14 have set to be an accurate circle because diffraction of light is avoided, this invention is not limited: For example, any shape such as an ellipse and a rectangular may be adapted.

Description of Codes

100 . . . Soft Contact Lens; 10 . . . Light-shielding Portion; 12 . . . Pinhole; 14 . . . Holes; 16 . . . Lens Main Body; 16C . . . Light-transmitting Portion; 18 . . . Main Body of Light-shielding Portion; 20 . . . Cornea; 26 . . . Retina; and O . . . Optical Axis

The invention claimed is:

1. A soft contact lens which is fitted to a cornea, the soft contact lens comprising:
a light-shielding portion which shields incident light that is incident to the cornea; and
a lens main body made of a light permeable member that allows incident light to be transmitted, the lens main body having a diameter larger than that of the light-shielding portion and covering a front surface of the light-shielding portion and a back surface thereof,
wherein the light-shielding portion contains:
a main body of the light-shielding portion which is made of a light-shielding member;
an aperture that allows the incident light to be transmitted, the aperture being positioned on a position of the main body of the light-shielding portion, the position including an optical axis extending to a center of the cornea and a center of a retina; and
a plurality of holes that maintains a scotopic vision and a night vision, the holes being provided around the aperture in the main body of the light-shielding portion and each of the holes having a diameter smaller than that of the aperture.

2. The soft contact lens according to claim 1 wherein a diameter of each of the holes is not less than 0.17 mm and not more than 0.18 mm.

3. The soft contact lens according to claim 2 wherein the diameter of each of the holes is obtained by the following equation:

$$\phi = \sqrt{2\lambda f}$$ [Equation 1]

where the diameter of each of the holes is Ø, a wavelength of incident light is λ, and a distance from the cornea to the retina is a focal distance f.

4. The soft contact lens according to claim 1 wherein a diameter of the aperture is set to be not less than 1.0 mm and not more than 1.6 mm whereby a near vision corresponding to an added dioptric power for a multifocal lens is obtained, a far vision on myopia or hyperopia is improved and an effect of a correction of astigmatism is obtained.

5. The soft contact lens according to claim 2 wherein a diameter of the aperture is set to be not less than 1.0 mm and not more than 1.6 mm whereby a near vision corresponding to an added dioptric power for a multifocal lens is obtained, a far vision on myopia or hyperopia is improved and an effect of a correction of astigmatism is obtained.

6. The soft contact lens according to claim 3 wherein a diameter of the aperture is set to be not less than 1.0 mm and not more than 1.6 mm whereby a near vision corresponding to an added dioptric power for a multifocal lens is obtained, a far vision on myopia or hyperopia is improved and an effect of a correction of astigmatism is obtained.

7. The soft contact lens according to claim 1 wherein the diameter of the light-shielding portion is less than the diameter of lens main body, and the lens main body around the light-shielding portion functions as a light-transmission portion that maintains a peripheral vision by gathering the incident light to the cornea.

8. The soft contact lens according to claim 7 wherein the diameter of the light-shielding portion is not less than 4.0 mm and not more than 9.0 mm and the diameter of the lens main body is 14.0 mm or so.

9. The soft contact lens according to claim 2 wherein the diameter of the light-shielding portion is less than the diameter of lens main body, and the lens main body around the light-shielding portion functions as a light-transmission portion that maintains a peripheral vision by gathering the incident light to the cornea.

10. The soft contact lens according to claim 9 wherein the diameter of the light-shielding portion is not less than 4.0 mm and not more than 9.0 mm and the diameter of the lens main body is 14.0 mm or so.

11. The soft contact lens according to claim 3 wherein the diameter of the light-shielding portion is less than the diameter of lens main body, and the lens main body around the light-shielding portion functions as a light-transmission portion that maintains a peripheral vision by gathering the incident light to the cornea.

12. The soft contact lens according to claim 11 wherein the diameter of the light-shielding portion is not less than 4.0 mm and not more than 9.0 mm and the diameter of the lens main body is 14.0 mm or so.

13. The soft contact lens according to claim 4 wherein the diameter of the light-shielding portion is less than the diameter of lens main body, and the lens main body around the light-shielding portion functions as a light-transmission portion that maintains a peripheral vision by gathering the incident light to the cornea.

14. The soft contact lens according to claim 13 wherein the diameter of the light-shielding portion is not less than 4.0 mm and not more than 9.0 mm and the diameter of the lens main body is 14.0 mm or so.

15. The soft contact lens according to claim 5 wherein the diameter of the light-shielding portion is less than the diameter of lens main body, and the lens main body around the light-shielding portion functions as a light-transmission portion that maintains a peripheral vision by gathering the incident light to the cornea.

16. The soft contact lens according to claim 15 wherein the diameter of the light-shielding portion is not less than 4.0 mm and not more than 9.0 mm and the diameter of the lens main body is 14.0 mm or so.

17. The soft contact lens according to claim 6 wherein the diameter of the light-shielding portion is less than the diameter of lens main body, and the lens main body around the light-shielding portion functions as a light-transmission portion that maintains a peripheral vision by gathering the incident light to the cornea.

18. The soft contact lens according to claim 17 wherein the diameter of the light-shielding portion is not less than 4.0 mm and not more than 9.0 mm and the diameter of the lens main body is 14.0 mm or so.

19. The soft contact lens according to claim 1 wherein the lens main body contains a front surface portion and a rear surface portion, and the light-shielding portion is held between the front surface portion of the lens main body and a rear surface portion thereof.

20. The soft contact lens according to claim 2 wherein the lens main body contains a front surface portion and a rear surface portion, and the light-shielding portion is held between the front surface portion of the lens main body and a rear surface portion thereof.

21. The soft contact lens according to claim 3 wherein the lens main body contains a front surface portion and a rear surface portion, and the light-shielding portion is held between the front surface portion of the lens main body and a rear surface portion thereof.

22. The soft contact lens according to claim 4 wherein the lens main body contains a front surface portion and a rear surface portion, and the light-shielding portion is held between the front surface portion of the lens main body and a rear surface portion thereof.

23. The soft contact lens according to claim 5 wherein the lens main body contains a front surface portion and a rear surface portion, and the light-shielding portion is held between the front surface portion of the lens main body and a rear surface portion thereof.

24. The soft contact lens according to claim 6 wherein the lens main body contains a front surface portion and a rear surface portion, and the light-shielding portion is held between the front surface portion of the lens main body and a rear surface portion thereof.

25. The soft contact lens according to claim 7 wherein the lens main body contains a front surface portion and a rear surface portion, and the light-shielding portion is held between the front surface portion of the lens main body and a rear surface portion thereof.

26. The soft contact lens according to claim 8 wherein the lens main body contains a front surface portion and a rear surface portion, and the light-shielding portion is held between the front surface portion of the lens main body and a rear surface portion thereof.

27. The soft contact lens according to claim 9 wherein the lens main body contains a front surface portion and a rear surface portion, and the light-shielding portion is held between the front surface portion of the lens main body and a rear surface portion thereof.

28. The soft contact lens according to claim 10 wherein the lens main body contains a front surface portion and a rear surface portion, and the light-shielding portion is held between the front surface portion of the lens main body and a rear surface portion thereof.

29. The soft contact lens according to claim 11 wherein the lens main body contains a front surface portion and a rear surface portion, and the light-shielding portion is held between the front surface portion of the lens main body and a rear surface portion thereof.

30. The soft contact lens according to claim 12 wherein the lens main body contains a front surface portion and a rear surface portion, and the light-shielding portion is held between the front surface portion of the lens main body and a rear surface portion thereof.

31. The soft contact lens according to claim 13 wherein the lens main body contains a front surface portion and a rear surface portion, and the light-shielding portion is held between the front surface portion of the lens main body and a rear surface portion thereof.

32. The soft contact lens according to claim 14 wherein the lens main body contains a front surface portion and a rear surface portion, and the light-shielding portion is held between the front surface portion of the lens main body and a rear surface portion thereof.

33. The soft contact lens according to claim 15 wherein the lens main body contains a front surface portion and a rear surface portion, and the light-shielding portion is held between the front surface portion of the lens main body and a rear surface portion thereof.

34. The soft contact lens according to claim 16 wherein the lens main body contains a front surface portion and a rear surface portion, and the light-shielding portion is held between the front surface portion of the lens main body and a rear surface portion thereof.

35. The soft contact lens according to claim 17 wherein the lens main body contains a front surface portion and a rear surface portion, and the light-shielding portion is held between the front surface portion of the lens main body and a rear surface portion thereof.

36. The soft contact lens according to claim 18 wherein the lens main body contains a front surface portion and a rear surface portion, and the light-shielding portion is held between the front surface portion of the lens main body and a rear surface portion thereof.

* * * * *